(No Model.)
U. & H. E. EBERHARDT.
MILLING CUTTER.
No. 433,458.  Patented Aug. 5, 1890.
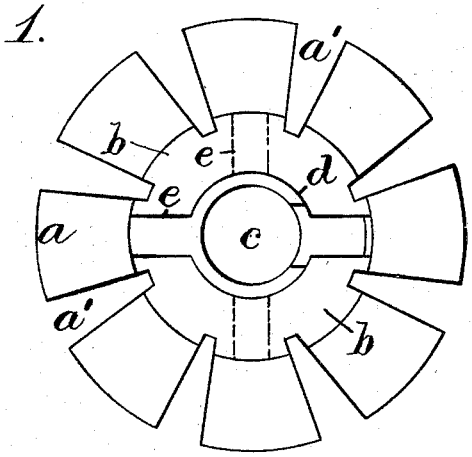
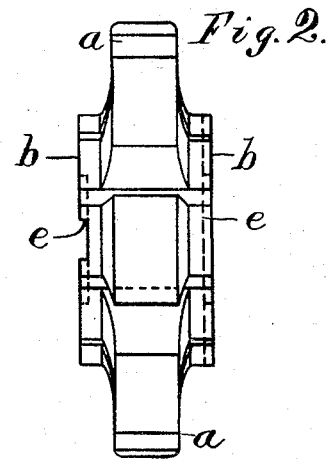
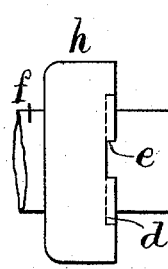
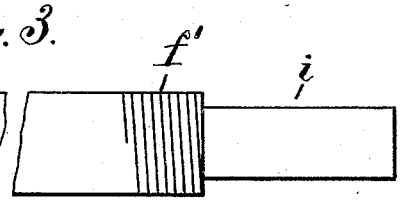
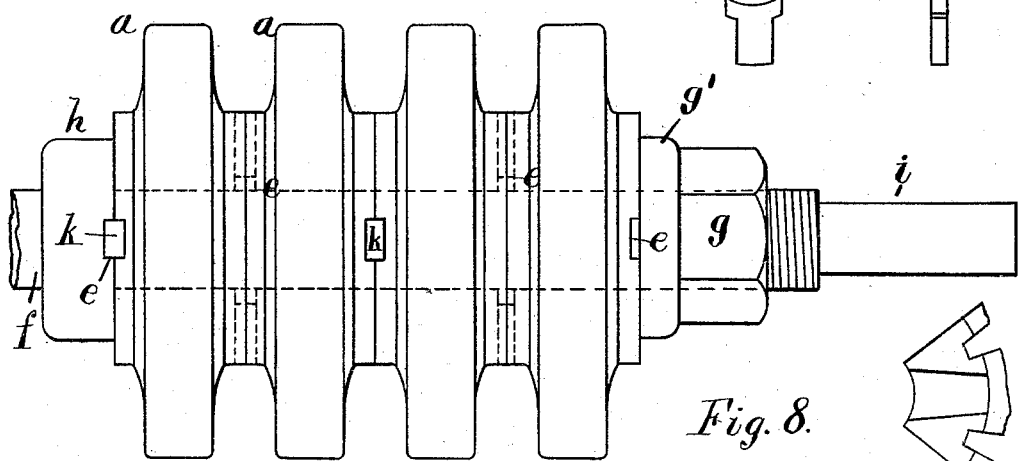
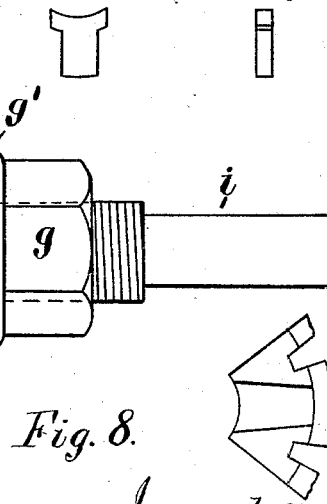
Attest:
L. Lee.
John Tanner Jr.
Inventor
U. Eberhardt & H. E. Eberhardt
per Crane & Miller, Attys.

UNITED STATES PATENT OFFICE.

ULRICH EBERHARDT AND HENRY E. EBERHARDT, OF NEWARK, NEW JERSEY.

MILLING-CUTTER.

SPECIFICATION forming part of Letters Patent No. 433,458, dated August 5, 1890.

Application filed January 9, 1890. Serial No. 336,393. (No model.)

*To all whom it may concern:*

Be it known that we, ULRICH EBERHARDT and HENRY E. EBERHARDT, citizens of the United States, residing at Newark, Essex county, New Jersey, have invented certain new and useful Improvements in Milling-Cutters, fully described and represented in the following specification and the accompanying drawings, forming a part of the same.

The object of the present invention is to prevent the slipping of a series of cutters when clamped together upon a spindle; and the invention is applicable to the series of cutters used for cutting a number of teeth simultaneously in gear or rack cutting machines.

The nature of the improvement will be understood by reference to the annexed drawings, in which—

Figure 1 is a side view, and Fig. 2 an edge view, of a toothed cutter for use in cutting gears or rack-teeth. Fig. 3 shows a portion of a cutter-spindle with a collar thereon, a break being shown in the spindle for want of space to show it of the proper length. Fig. 4 is an end view of said spindle; Fig. 5, a side view of the spindle with four cutters clamped thereon, the teeth being omitted from the cutters. Fig. 6 is a side view, and Fig. 7 an edge view, of one of the keys; and Fig. 8 a portion of the cutter-hub with a key of alternative construction.

$a$ are the cutters; $b$, a flat face upon the side of the same; $c$, the hole to fit the spindle; $d$, a shallow counterbore formed in the flat face $b$, and $e$ are shallow radial grooves of the same depth as the counterbore and extended from the same to the outer edge of the flat face. Such groove is preferably made radial that it may be formed by a milling-cutter all the way across the flat face $b$, as shown in Fig. 1.

$f$ is the spindle, provided at one end with thread $f'$ and nut $g$.

$h$ is the driving-collar of the spindle, provided like the cutter $a$ with counterbore $d$ and grooves $e$.

$k$ are keys fitted to the grooves $e$ and adapted to project therefrom sufficiently to engage a similar groove in an adjacent cutter. Such keys are shown fitted between the four cutters in Fig. 5, and also in the grooves of the collar $h$, to connect the same with the adjacent cutter. In this figure the cutters are shown clamped firmly against the collar $h$ by nut $g$ and a washer $g'$, the first cutter of the series being thus keyed to the collar $h$ and the subsequent cutters keyed to one another, so that the rotation of the spindle and its collar $h$ operates to drive the four cutters in the most positive manner independently of the friction exerted by the nut and its washer. Where a series of cutters are operated simultaneously, as shown in Fig. 5, the transverse strain upon the spindle is very great, and it is common to support the spindle at both sides of the cutters. A bearing $i$ is therefore shown at the right-hand end of the spindle outside of the nut, and a similar bearing would in practice be provided upon the spindle adjacent to the collar $h$.

The construction adopted in the present invention for coupling the series of cutters together is intended for application to the flat-faced cutters, which are already extensively used, and which would be seriously weakened if constructed with an ordinary key-seat inside the hole $c$, as it is very important to make such cutters as small in diameter as possible, both to economize the labor and material required in making the cutter and to diminish the radius of the cutter, and thus economize the power required to drive the same. The spaces $a'$ between the teeth of the cutter, Fig. 1, are, for these reasons, commonly extended quite close to the hole $c$, and the formation of a keyway in the hole would tend not only to greatly weaken the hub of the cutter, but would be very liable to crack the hub entirely through when the cutter was hardened.

The cutters might be connected by projections upon their adjoining faces, but any projection from the flat faces at the opposite sides of the cutter would be very objectionable, as in order to make a series of cutters operate successfully it is necessary to form the cutters with perfectly plane surfaces at their opposite sides, and to grind such surfaces carefully until the teeth of the cutters are adjusted exactly the right distance apart to form the teeth of uniform pitch between the several cutters in a series.

The use of shallow radial grooves with interposed keys, as shown herein, does not weaken the cutter injuriously, as the length through the hub of a gear-cutter is almost always much greater than the thickness of the hub on a radial line, and the weakening effect of such grooves may be diminished by forming the grooves upon the opposite faces of the cutter at right angles to one another, as shown in Figs. 1 and 2. By this construction the two grooves do not weaken the cutter so much as if they were exactly opposite to one another.

In Fig. 5 the ends of the alternate keyways are visible; but, owing to the alternate disposition of the keyways at right angles to one another upon the opposite faces of the cutters, the sides only of the intermediate keys are indicated, as by the dotted lines $e$. The keys cannot be clamped in the grooves by the pressure of the cutters, as it is essential to the adjustment of the cutters upon the spindle that their flat faces should be pressed rigidly together, and it is therefore necessary to provide some means for holding the keys from slipping out of the grooves. The counterbore $d$ is provided for such purpose, furnishing room for a head $l$ upon the key, which holds it in contact with the shaft and prevents it from sliding outward. Such counterbore is very cheaply made when the hole is formed in the cutter, and the radial grooves can also be made without any hand labor by the operation of a milling-machine, and the cutters are thus prepared for coupling together in series at a very trifling expense.

The keys are small bits of steel, and are readily formed by punching from a sheet of suitable thickness, and operate by the pressure upon their edges to drive the several cutters in the most positive manner. It will be readily seen that such method of coupling the cutters is superior to the use of a key in the shaft $f$ and a key-seat inside the hole in each cutter, as a key fitted radially upon the collar $h$ and upon the faces of the several cutters would have a much greater radius at which it transmits the driving force than the radius of the shaft itself.

It is not uncommon for a cutter when keyed to a shaft to be ruptured when in operation by the strain of the key in its key-seat, which liability is wholly avoided in the present construction by the diminished pressure exerted upon the key in doing the same work by the greater distance of the wearing-surfaces of the key from the center of rotation.

Instead of forming a head upon the key to prevent its slipping out of the groove $e$, it may be made wider at the inner end than the outer, as shown in Fig. 8; but such construction would forbid the formation of the grooves by a milling-cutter, and would therefore involve a greater cost without any corresponding advantage.

Having thus set forth the invention, what is claimed herein is—

1. A cutter having flat faces upon its opposite sides provided with one or more shallow grooves to receive a coupling-key, as and for the purpose set forth.

2. A series of cutters having flat faces at their adjacent sides provided with radial grooves and interposed keys, as and for the purpose set forth.

3. The combination, with a series of cutters having flat faces upon their opposite sides and shallow grooves formed in such faces, of a cutter-spindle having a collar provided with corresponding groove or grooves, and means for clamping the cutters against such collar, with keys inserted in the grooves, as and for the purpose set forth.

4. The combination, with a cutter having flat faces upon its opposite sides and provided with the counterbore $d$ and radial grooves $e$, of keys $k$, inserted in such grooves and provided with heads fitted to the counterbore, as and for the purpose set forth.

5. The combination, with a series of flat-faced cutters provided each with counterbore $d$ and radial grooves $e$, of a cutter-spindle having the collar $h$, provided with corresponding counterbore and grooves, and keys inserted in such grooves with heads fitted to the counterbores, and the whole clamped against the collar by a nut upon the spindle, substantially as herein set forth.

In testimony whereof we have hereunto set our hands in the presence of two subscribing witnesses.

ULRICH EBERHARDT.
HENRY E. EBERHARDT.

Witnesses:
THOS. S. CRANE,
HENRY J. MILLER.